United States Patent
Oman

(10) Patent No.: US 8,437,357 B2
(45) Date of Patent: May 7, 2013

(54) METHOD OF CONNECTING VLAN SYSTEMS TO OTHER NETWORKS VIA A ROUTER

(75) Inventor: Andreas Oman, Stockholm (SE)

(73) Assignee: Packetfront Network Products AB, Kista (SE)

( * ) Notice: Subject to any disclaimer, the term of this patent is extended or adjusted under 35 U.S.C. 154(b) by 0 days.

(21) Appl. No.: 12/601,768

(22) PCT Filed: May 28, 2008

(86) PCT No.: PCT/EP2008/056563
§ 371 (c)(1),
(2), (4) Date: Jun. 9, 2010

(87) PCT Pub. No.: WO2008/145677
PCT Pub. Date: Dec. 4, 2008

(65) Prior Publication Data
US 2010/0254396 A1    Oct. 7, 2010

(30) Foreign Application Priority Data
May 29, 2007    (EP) .................................... 07109108

(51) Int. Cl.
*H04L 12/28* (2006.01)
*H04L 12/56* (2006.01)
(52) U.S. Cl.
USPC ........ 370/401; 370/254; 370/256; 370/395.53
(58) Field of Classification Search .................. 370/401, 370/395.53
See application file for complete search history.

(56) References Cited

U.S. PATENT DOCUMENTS

| 5,586,255 A | 12/1996 | Tanaka et al. |
| 5,659,736 A | 8/1997 | Hasegawa et al. |

(Continued)

FOREIGN PATENT DOCUMENTS

| EP | 1 039 698 | 9/2000 |
| EP | 1780941 | 5/2007 |

(Continued)

OTHER PUBLICATIONS

Bodzinga, Anne, et al., "Interworking IPTV Services with IMS", Telecommunications Network Strategy and Planning Symposium 2006 pp. 1-5.

(Continued)

*Primary Examiner* — Hassan Kizou
*Assistant Examiner* — Emmanuel Maglo
(74) *Attorney, Agent, or Firm* — Faegre Baker Daniels LLP

(57) ABSTRACT

A local system including at least two VLANs may be connected to a local layer 2 switch to a wider network by providing a connection between the local switch and a router port and a single logical layer 3 interface may be assigned to the VLANs. A VLAN tag may be assigned to each connected VLAN. Outgoing data including the user's address, the intended recipient of the data and the VLAN tag assigned to the VLAN may be communicated to the router. The address of the user and the VLAN tag may be copied to a forwarding table, and the outgoing data may be forwarded to the wider network for delivery to the intended recipient. Incoming date intended for delivery to the user may be received at the assigned layer 3 interface and forwarded to the local switch for delivery to the user.

8 Claims, 3 Drawing Sheets

U.S. PATENT DOCUMENTS

| | | | |
|---|---|---|---|
| 5,684,988 | A | 11/1997 | Pitchaikani et al. |
| 5,689,598 | A | 11/1997 | Dean, Jr. et al. |
| 5,802,042 | A | 9/1998 | Natarajan et al. |
| 5,832,503 | A | 11/1998 | Malik et al. |
| 5,913,037 | A | 6/1999 | Spofford et al. |
| 6,028,769 | A | 2/2000 | Zurek |
| 6,059,614 | A | 5/2000 | Shelby et al. |
| 6,122,639 | A | 9/2000 | Babu et al. |
| 6,222,852 | B1 | 4/2001 | Gandy |
| 6,233,616 | B1 | 5/2001 | Reid |
| 6,286,038 | B1 | 9/2001 | Reichmeyer et al. |
| 6,393,472 | B1 | 5/2002 | Anerousis et al. |
| 6,430,621 | B1 | 8/2002 | Srikanth et al. |
| 6,560,236 | B1 | 5/2003 | Varghese et al. |
| 6,680,945 | B1 | 1/2004 | Merchant et al. |
| 6,769,124 | B1 | 7/2004 | Schoening et al. |
| 6,839,749 | B1 | 1/2005 | Bera |
| 6,876,667 | B1 | 4/2005 | Synnestvedt et al. |
| 6,885,657 | B1 | 4/2005 | Rabenko et al. |
| 6,954,436 | B1* | 10/2005 | Yip et al. ............. 370/254 |
| 6,958,996 | B2 | 10/2005 | Xiong |
| 7,054,309 | B1 | 5/2006 | Hoot et al. |
| 7,082,463 | B1 | 7/2006 | Bradley et al. |
| 7,099,158 | B1 | 8/2006 | Bjorklund |
| 7,139,818 | B1 | 11/2006 | Kinnear, Jr. et al. |
| 7,200,145 | B1 | 4/2007 | Edsall et al. |
| 7,218,827 | B2 | 5/2007 | Vongseng et al. |
| 7,386,629 | B2 | 6/2008 | Rover et al. |
| 7,581,024 | B1* | 8/2009 | Yip et al. ............. 709/244 |
| 7,760,984 | B2 | 7/2010 | Solheid et al. |
| 7,801,133 | B2 | 9/2010 | Siegel |
| 7,826,463 | B2 | 11/2010 | Patel et al. |
| 7,945,164 | B2 | 5/2011 | Theodoras, II |
| 7,948,993 | B2* | 5/2011 | Kini et al. ............. 370/395.54 |
| 7,969,880 | B2* | 6/2011 | Yano et al. ............. 370/230.1 |
| 7,983,190 | B2* | 7/2011 | Hirota ............. 370/254 |
| 7,990,994 | B1* | 8/2011 | Yeh et al. ............. 370/431 |
| 2002/0023174 | A1 | 2/2002 | Garrett et al. |
| 2002/0075844 | A1 | 6/2002 | Hagen |
| 2002/0161801 | A1 | 10/2002 | Hind et al. |
| 2003/0039249 | A1 | 2/2003 | Basso et al. |
| 2003/0056225 | A1 | 3/2003 | Bione |
| 2003/0131107 | A1 | 7/2003 | Godse et al. |
| 2003/0165140 | A1* | 9/2003 | Tang et al. ............. 370/393 |
| 2003/0200285 | A1 | 10/2003 | Hansen et al. |
| 2003/0206548 | A1* | 11/2003 | Bannai et al. ............. 370/389 |
| 2004/0013126 | A1 | 1/2004 | Yun |
| 2004/0017829 | A1 | 1/2004 | Gray et al. |
| 2004/0047353 | A1 | 3/2004 | Umayabashi et al. |
| 2004/0049568 | A1 | 3/2004 | Nguyen et al. |
| 2004/0052216 | A1 | 3/2004 | Roh |
| 2004/0090965 | A1 | 5/2004 | Lin |
| 2004/0128367 | A1 | 7/2004 | Piercy et al. |
| 2004/0160464 | A1 | 8/2004 | Reyna |
| 2004/0172412 | A1 | 9/2004 | Files et al. |
| 2004/0213152 | A1 | 10/2004 | Matuoka et al. |
| 2004/0258074 | A1 | 12/2004 | Williams et al. |
| 2004/0267949 | A1 | 12/2004 | Rover et al. |
| 2005/0044265 | A1 | 2/2005 | Vinel et al. |
| 2005/0049886 | A1 | 3/2005 | Grannan et al. |
| 2005/0129379 | A1 | 6/2005 | Reagan et al. |
| 2005/0216584 | A1 | 9/2005 | Chisholm |
| 2005/0281526 | A1 | 12/2005 | Vongseng et al. |
| 2005/0286517 | A1 | 12/2005 | Babbar et al. |
| 2006/0002324 | A1 | 1/2006 | Babbar et al. |
| 2006/0026228 | A1 | 2/2006 | Kim |
| 2006/0047791 | A1 | 3/2006 | Bahl |
| 2006/0085532 | A1 | 4/2006 | Chu et al. |
| 2006/0261116 | A1 | 11/2006 | Brandeis |
| 2006/0277603 | A1 | 12/2006 | Kelso et al. |
| 2007/0058538 | A1 | 3/2007 | Chiang et al. |
| 2007/0058638 | A1 | 3/2007 | Guichard et al. |
| 2007/0061458 | A1 | 3/2007 | Lum |
| 2007/0168547 | A1* | 7/2007 | Krywaniuk ............. 709/238 |
| 2007/0174522 | A1 | 7/2007 | Lee |
| 2007/0203999 | A1 | 8/2007 | Townsley et al. |
| 2007/0286198 | A1* | 12/2007 | Muirhead et al. ............. 370/392 |
| 2008/0162609 | A1 | 7/2008 | Bigian et al. |
| 2008/0219281 | A1 | 9/2008 | Akin et al. |
| 2008/0285569 | A1* | 11/2008 | Stademann et al. ..... 370/395.31 |
| 2011/0161360 | A1 | 6/2011 | Lundstrom |

FOREIGN PATENT DOCUMENTS

| | | |
|---|---|---|
| GB | 2 069 767 | 1/1981 |
| KR | 2001/0038481 | 5/2001 |
| WO | WO9534975 A1 | 12/1995 |
| WO | WO 00/60864 | 10/2000 |
| WO | WO 02/35797 | 5/2002 |
| WO | WO 2008/068316 | 6/2008 |
| WO | WO 2008/113852 | 9/2008 |
| WO | WO 2008/113854 | 9/2008 |
| WO | WO 2009/019300 | 2/2009 |
| WO | WO 2009/027513 | 3/2009 |
| WO | WO 2009/047215 | 4/2009 |
| WO | WO 2009/047334 | 4/2009 |
| WO | WO 2009/047345 | 4/2009 |

OTHER PUBLICATIONS

European Search Report issued in EP Application 06125497, Publication 1931085, mailed Jan. 9, 2009, 8 pages.
International Search Report and Written Opinion for PCT/EP2008/053369, mailed Jul. 2, 2008, 10 pages.
International Search Report and Written Opinion for PCT/EP2008/060384, mailed Nov. 11, 2008, 10 pages.
International Search Report and Written Opinion for PCT/EP2008/061403, mailed Dec. 18, 2008, 12 pages.
International Search Report and Written Opinion for PCT/EP2007/063467, mailed Mar. 4, 2008, 7 pages.
International Search Report for PCT/EP2008/053374, mailed Sep. 25, 2009, 3 pages.
International Search Report and Written Opinion for PCT/EP2008/056563, mailed Aug. 21, 2008, 11 pages.
International Search Report for PCT/EP2008/063667, mailed Jul. 30, 2009, 3 pages.
International Search Report for PCT/EP2008/063639, mailed Oct. 1, 2009, 2 pages.
International Search Report for PCT/EP2008/063270, mailed Jan. 21, 2009, 3 pages.
International Search Report and Written Opinion for PCT/EP2008/056565, mailed Jan. 19, 2009.
European Search Report issued in EP Application 07104707, Publication 1973269, dated Aug. 27, 2007, 7 pages.

* cited by examiner

METHOD OF CONNECTING VLAN SYSTEMS TO OTHER NETWORKS VIA A ROUTER

CROSS-REFERENCE TO RELATED APPLICATIONS

The present application is a national phase application of PCT/EP2008/056563, filed pursuant to 35 U.S.C. §371, which claims priority to EP 07109108.6, filed May 29, 2007. Both applications are incorporated herein by reference in their entirety.

TECHNICAL FIELD

This invention relates to techniques for connecting systems comprising multiple virtual local area networks (VLANs) to a wider network via a router.

BACKGROUND ART

FIG. 1 shows a generic description of a broadband network for providing telephone, internet and TV/video services to subscribers in a number of locations. A series of service providers provide the various services (SP1, SP2, SP3) to the network 10 via conventional access points 12. The network 10 provides connects these to subscribers via routers 14 located close to the subscribers. These can include business locations that can include routers in commercial property 16, and domestic subscribers with routers located in a central office 18 for a neighbourhood of separate dwellings (houses 17), or in a single building 19 such as an apartment building. The network operator manages the network function by the use of a control and provisioning system 20.

Certain users, particularly business users, like to be able to operate local area networks (LANs). To support this while still having connectivity to a wider network, a series of products and solutions are currently available to allow Layer 2 LANs and virtual LANs (VLANs) to be provided. VLANs allow an effectively separate LAN to be established within a single physical infrastructure. A simple VLAN system is shown in FIG. 2 and comprises a local (layer 2) switch 2 that has a number of connections 4 to the various users connected to the VLAN and a physical connection 6 to a port on the router 14. The router will have a fixed number of ports available for such connections. One example, the ASR4K of Packetfront has 32 ports available. The router 14 provides layer 3 interfaces 8 for the connected VLANS and is connected to the wider network 10. The local switch 2, user connections 4 and connection 6 to interface 8 define a Layer 2 segment VLAN.

The system of FIG. 2 has one VLAN connected via the local switch 2. However, it can often be desirable to operate more than one VLAN from a local switch. Details of the general approach for such solutions can be found in the white paper 'Layer 2 Virtual Private Networks', December 2005 from World Wide Packets Inc of Spokane Valley Wash. USA (see http://www.wwp.com/technology/white-papers/L2-VPN-WhitePaper.pdf). Local switch devices, such as the LightningEdge devices from World Wide Packets, allow several VLANs to be connected to a router for access to a wider network. In accordance with the appropriate standards (IEEE 802.1Q), tags are associated with each VLAN as identifiers. Up to 4094 tags/VLANs are available for each device. When these devices are connected to routers (e.g. router 14 of FIG. 1), the routers typically assign a logical layer 3 interface for each VLAN. Therefore, including the tag in the addressing for data allows it to be directed to the appropriate VLAN.

Various proposals have been made for connecting to VLANs. In US2007/058638, a routing mechanism provides network segmentation preservation by route distribution with segment identification, policy distribution for a given VPN segment, and encapsulation/decapsulation for each segment using an Ethernet VLAN_ID, indicative of the VPN segment (subnetwork). Encapsulated segmentation information in a message packet identifies which routing and forwarding table is employed for the next hop. A common routing instance receives the message packets from the common interface, and indexes a corresponding VRF table from the VLAN ID, or segment identifier, indicative of the subnetwork (e.g. segment). In this manner, the routing instance receives the incoming message packet, decapsulates the VLAN ID in the incoming message packet, and indexes the corresponding VRF and policy ID from the VLAN ID, therefore employing a common routing instance over a common subinterface for a plurality of segments (subnetworks) coupled to a particular forwarding device (e.g. VPN router). The system described in U.S. Pat. No. 7,200,145 uses a layer 2 switch (L2 switch), or bridge, to separate user's message traffic by use of Virtual Local Area Networks (VLANs) defined within the switch. Three new types of ports are defined, "promiscuous" ports "isolated" ports, and "community" ports. Three types of VLANs internal to the switch are defined, "primary" VLANs, "isolated" VLANs and "community" VLANs. The promiscuous ports are connected to layer 3 or layer 4 devices. Isolated ports and community ports are connected to individual user's servers, etc., and maintain traffic for each user separate from other users. The primary VLAN connects to all promiscuous ports, to all isolated ports, and to all community ports. The primary VLAN is a one way connection from promiscuous ports to isolated or community ports. An isolated VLAN connects to all promiscuous ports and to all isolated ports. The isolated VLAN is a one way connection from an isolated port to the promiscuous ports. A community VLAN is defined as connecting to a group of community ports, and also connecting to all of the promiscuous ports. The group of community ports is referred to as a "community" of community ports. A community VLAN is a one way connection from a community of ports to the promiscuous ports, but allows a packet received by one community port to be transmitted out of the switch, through the other community ports connected to that community VLAN.

A number of problems exist with current approaches for connecting multiple VLAN systems. One is that assigning a separate logical layer 3 interfaces to each VLAN can quickly use up memory in the router, especially for lower end routers with limited memory. Another is that VLAN to VLAN communication can require the use of a Layer 2 switch which sits between the local switch and the router. As such a communication path avoids the router; it can also avoid router functions such as filters and firewalls which can be undesirable.

It is an object of the invention to provide a technique which allows direct access for all VLANs to the router without these problems.

DISCLOSURE OF THE INVENTION

One aspect of this invention provides a method for connecting a local system comprising at least two VLANs connected to a local layer 2 switch to a wider network via a router, the method comprising:
providing a connection between the local switch and a port on the router;
assigning a single logical layer 3 interface to the two VLANs connected via the local switch;

assigning a VLAN tag to each connected VLAN;
communicating outgoing data from a user connected to one of the two connected VLANs to the router via the local switch, the outgoing data including the address of the user in the VLAN, the intended recipient of the data and the VLAN tag assigned to the VLAN to which the user is connected;
on receipt of the outgoing data at the router, copying the address of the user and the VLAN tag to a forwarding table;
forwarding the outgoing data from the assigned layer 3 interface to the wider network for delivery to the intended recipient;
receiving at the layer 3 interface incoming data intended for delivery to the user, the data including the address of the user;
consulting the lookup table to obtain the VLAN tag associated with the address of the user;
applying the VLAN tag to the incoming data; and
forwarding the incoming data and VLAN tag to the local switch for delivery to the user.

Another aspect of this invention provides a system for connecting a user in a local system comprising a VLAN to a wider network, comprising:
a local layer 2 switch to which the VLAN is connected, the local switch having at least two VLANs connected thereto and being configured to assign a VLAN tag to each connected VLAN; and
a router for receiving outgoing data from a user connected to one of the VLANs via the local switch, the outgoing data including the address of the user in the VLAN, the intended recipient of the data and the VLAN tag assigned to the VLAN to which the user is connected, the local switch being connected to a port on the router;
wherein the router assigns a single layer 3 interface to the connected VLANs and, on receipt of the outgoing data, copies the address of the user and the VLAN tag to a forwarding table and forwards the outgoing data to the wider network via the layer 3 interface for delivery to the intended recipient; and on receipt of incoming data at the assigned layer 3 interface intended for delivery to the user which includes the address of the user, consults the lookup table to obtain the VLAN tag associated with the address of the user, applies the VLAN tag to the incoming data, and forwards the incoming data and VLAN tag to the local switch for delivery to the user.

In preferred embodiments, multiple local switches are provided, each of which has multiple VLANs connected thereto. Similarly, multiple routers can be provided.

Each local switch is preferably connected to a single logical port on the router.

The wider network is typically a broadband network that can provide internet, TV and phone connectivity for users.

MODE(S) FOR CARRYING OUT THE INVENTION

Figure 1:
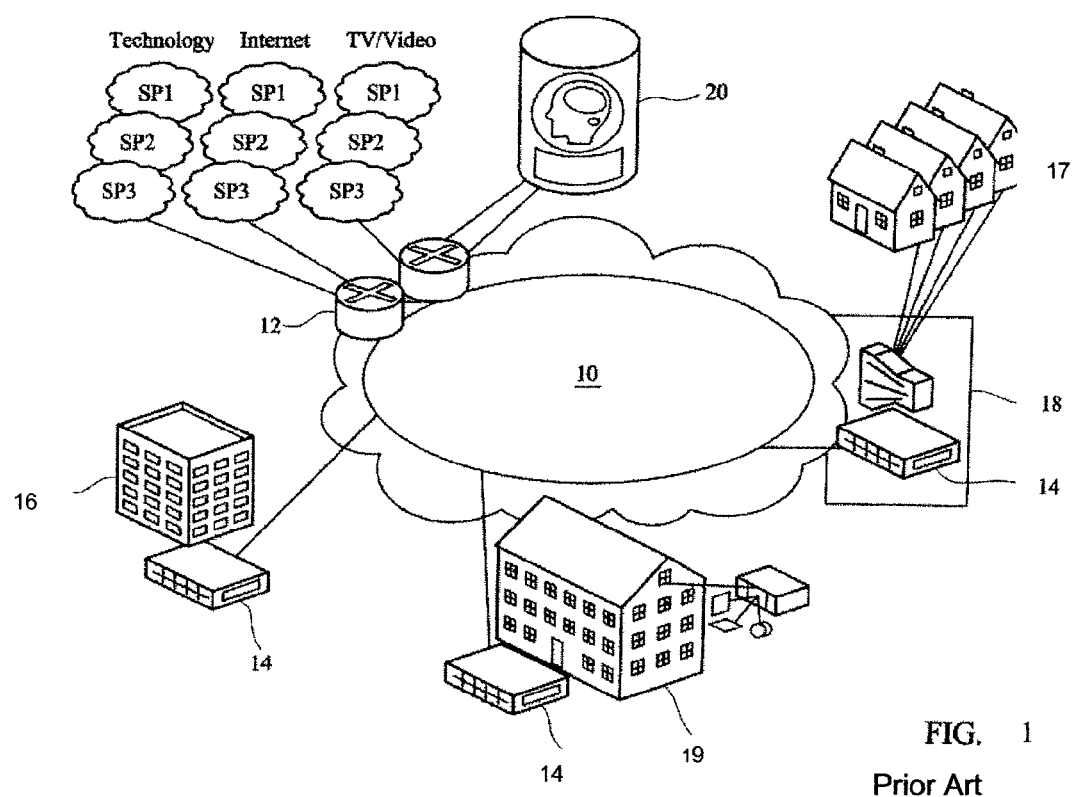
FIG. 1 shows a generic network system in which the invention can be used.
Figure 2:
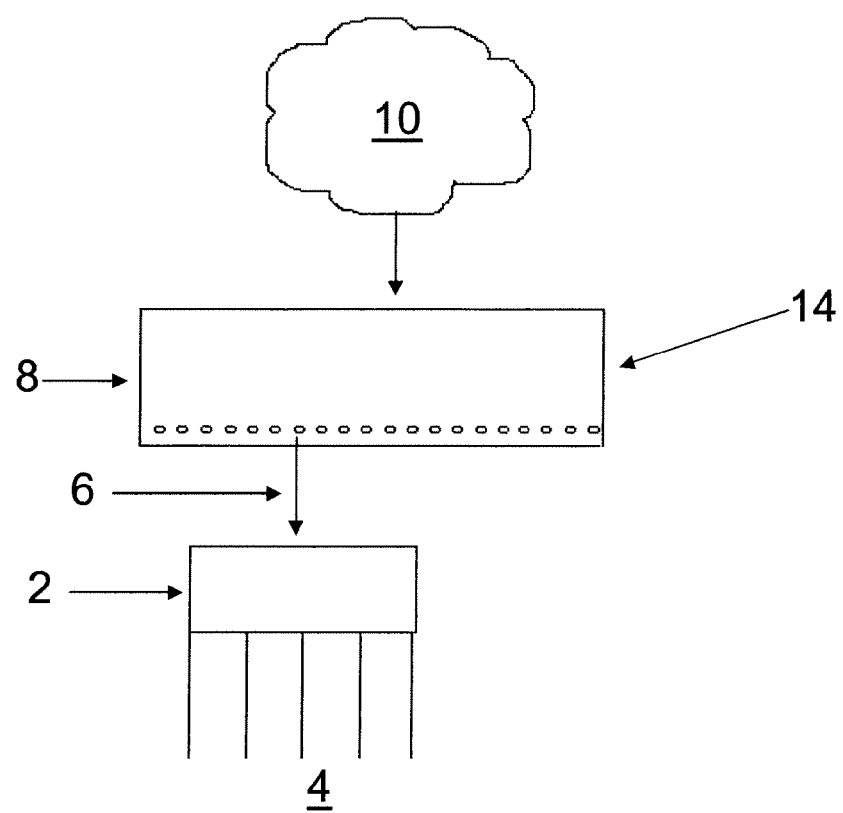
FIG. 2 shows a prior art configuration for a VLAN connected to a router.

A network system in which the invention operates is shown in FIG. 1. Operation of the network 10 is controlled by a control and provisioning system 20 that configures the various elements of the network to operate in the desired manner.

Figure 3:
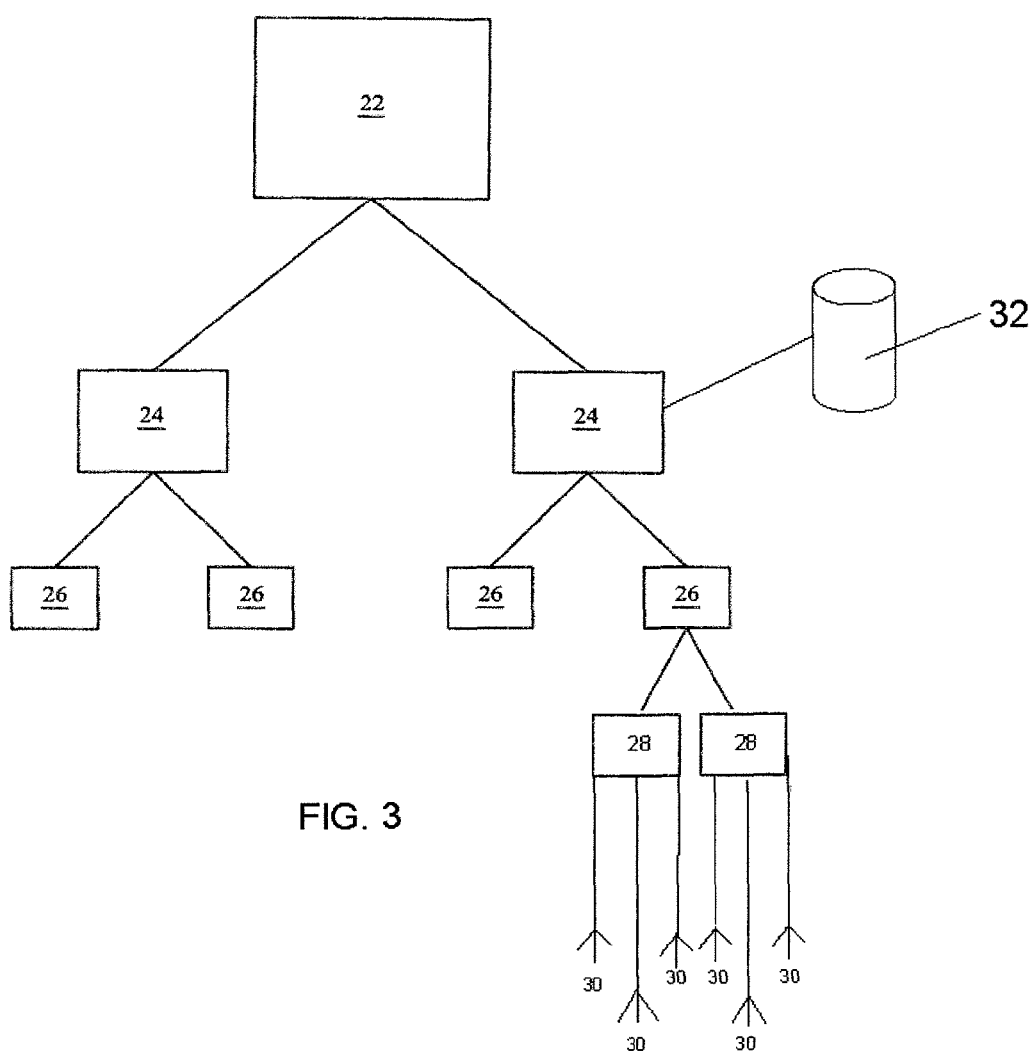
FIG. 3 shows a schematic of a system according to an embodiment of the invention.

For the function of the control and provisioning system 20, the network can be considered in an abstract way as comprising a core 22 having one or more cells 24, each cell having one or more network elements 26 as is shown in FIG. 3. Subscribers 28 connect to the network elements 26. This structure is not to be confused with the physical elements making up the network. The functional blocks 22, 24, 26 may be wholly or partly resident in the same or different physical elements, depending on the exact size and makeup of the network in question, although typically, each network element 26 will comprise a router.

In one embodiment of the invention, the subscribers 28 comprise local (layer 2) switches having a number of VLANs 30 connected thereto. Each VLAN will typically have a number of individual users in the conventional manner.

In use, the local switches 28 are provided with a single physical connection to the router 26 with one or more logical layer 3 interfaces being assigned to this connection. Typically one layer 3 interface is assigned to all of the connected VLANs but it is also possible to sub-divide the connected VLANs into groups, each with an assigned layer 3 interface. By assigning single layer 3 addresses to multiple VLANs, it is possible to connect a larger number of VLANs to the router without excedding its memory capacity. A user connected to one of the VLANs communicates with the network by sending data over the VLAN that includes its logical address in the normal manner. The local switch provides the VLAN tag for that data to identify in which VLAN the user is connected.

The outgoing data, including the VLAN tag is sent to the assigned layer 3 interface on the router 26. On reception of the outgoing data, the router 26 reads the addressing and loads the user address and associated VLAN tag into a forwarding table 32. The data is then forwarded to the wider network using the recipient address in the usual manner.

Incoming data will be addressed to the user with the usual logical address, i.e. not including the VLAN tag. On receipt of the incoming data, the router 26 consults to lookup table 32 to determine the VLAN tag associated with the logical destination address of the user and appends it to the data. This is then communicated to the local switch which in turn directs the data to the appropriate VLAN on which the user is located.

Because the router 26 can assign a single layer 3 interface to multiple VLANs, a relatively lower specification router can be used to provide connectivity for a large number of users. Since the router 26 is also typically under the control of the network operator, it is also possible to control interface assignment for the VLANs. From the user point of view, it is possible to communicate with other VLANs via the router and so get the benefit of all of the router functions (firewall, filtering, etc.).

Various changes to the system described above can be made while staying within the scope of the invention. Two or more local switches 28 can be connected to a router 26. Likewise, more than one router can have multiple VLANS attached via local switches in this way. Other such changes will also be apparent.

The invention claimed is:
1. A method for connecting a local system comprising at least two VLANs connected to a local layer 2 switch to a wider network via a router, the method comprising:
providing a connection between the local layer 2 switch and a port on the router;
assigning, at the layer 2 switch, a VLAN tag to each connected VLAN;

communicating outgoing data from a user connected to one of the at least two connected VLANs to the router via the local layer 2 switch, the outgoing data including an address of the user in the VLAN, the intended recipient of the data and the VLAN tag assigned to the VLAN to which the user is connected;

assigning, at the router, a single logical layer 3 address of a layer 3 interface to the at least two VLANs connected via the local layer 2 switch;

copying the address of the user and the VLAN tag to a forwarding table upon receipt of the outgoing data at the router;

forwarding the outgoing data including the single layer 3 address from the assigned layer 3 interface to the wider network for delivery to the intended recipient;

receiving at the layer 3 interface incoming data intended for delivery to the user, the data including the single logical layer 3 address without the VLAN tag;

consulting the lookup table to obtain the VLAN tag associated with the address of the user;

applying the VLAN tag to the incoming data; and forwarding the incoming data and VLAN tag to the local layer 2 switch for delivery to the user.

2. A method as claimed in claim 1, wherein multiple local layer 2 switches are provided, each having multiple VLANs connected thereto.

3. A method as claimed in claim 1, comprising assigning a single layer 3 interface to all VLANs connected to the local layer 2 switch.

4. A method as claimed in claim 1, comprising assigning multiple layer 3 interfaces, at least one of which is assigned to multiple VLANs.

5. A system for connecting a user in a local system comprising a VLAN to a wider network, comprising:

a local layer 2 switch to which the VLAN is connected, the local layer 2 switch having at least two VLANs connected thereto and being configured to assign a VLAN tag to each connected VLAN; and a router for receiving outgoing data from a user connected to one of the VLANs via the local layer 2 switch, the outgoing data including the address of the user in the VLAN, the intended recipient of the data and the VLAN tag assigned to the VLAN to which the user is connected, the local layer 2 switch being connected to a port on the router;

wherein the router assigns a single logical layer 3 address of a layer 3 interface to the connected VLANs and, on receipt of the outgoing data, copies the address of the user and the VLAN tag to a forwarding table and forwards the outgoing data including the single logical layer 3 address to the wider network via the layer 3 interface for delivery to the intended recipient; and on receipt of incoming data at the assigned layer 3 interface intended for delivery to the user which includes the single logical layer 3 address without the VLAN tag, consults the lookup table to obtain the VLAN tag associated with the address of the user, applies the VLAN tag to the incoming data, and forwards the incoming data and VLAN tag to the local layer 2 switch for delivery to the user.

6. A system as claimed in claim 5, further comprising multiple local layer 2 switches connected to the router, each local layer 2 switch having a number of VLANs connected thereto.

7. A system as claimed in claim 5, comprising a number of routers, each with one or more local layer 2 switches connected thereto.

8. A system as claimed in claim 5, wherein each local layer 2 switch is connected to a respective single logical layer 3 interface on the router.

* * * * *